United States Patent
Tofte et al.

(10) Patent No.: US 11,859,620 B1
(45) Date of Patent: Jan. 2, 2024

(54) DETECTING AND UTILIZING WATER VIBRATIONS IN SUMP PUMP SYSTEM CONTROL

(71) Applicant: STATE FARM MUTUAL AUTOMOBILE INSURANCE COMPANY, Bloomington, IL (US)

(72) Inventors: Nathan L. Tofte, Downs, IL (US); Jonathan Christopher Hull, Bloomington, IL (US); John Donovan, Bloomington, IL (US); Richard Jan Tjaden, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 122 days.

(21) Appl. No.: 17/245,668

(22) Filed: Apr. 30, 2021

Related U.S. Application Data

(60) Provisional application No. 63/148,783, filed on Feb. 12, 2021, provisional application No. 63/148,880, (Continued)

(51) Int. Cl.
  *F04D 15/02* (2006.01)
  *G05B 15/02* (2006.01)
  (Continued)

(52) U.S. Cl.
  CPC ..... *F04D 15/0218* (2013.01); *F04D 15/0209* (2013.01); *G05B 15/02* (2013.01); *G08B 21/182* (2013.01); *H04L 12/2823* (2013.01)

(58) Field of Classification Search
  USPC ........................................................ 700/282
  See application file for complete search history.

(56) References Cited

U.S. PATENT DOCUMENTS 4,624,280 A * 11/1986 DePirro ............... E03F 7/04
  137/392
5,591,010 A    1/1997 van Zyl
  (Continued)

FOREIGN PATENT DOCUMENTS

| CN | 111626536 A | 9/2020 |
| CN | 113138558 A | 7/2021 |

(Continued)

OTHER PUBLICATIONS

Adafruit, "Assembled Adafruit HUZZAH32—ESP32 Feather Board— with Stacking Headers," Retrieved from the Internet at: <https://www.adafruit.com/product/3619> on Apr. 26, 2021.

(Continued)

*Primary Examiner* — Emilio J Saavedra
(74) *Attorney, Agent, or Firm* — MARSHALL, GERSTEIN & BORUN LLP

(57) ABSTRACT

A sump pump system may detect and utilize motion or acceleration of water in sump basins when implementing control of sump pumps. To detect the motion or acceleration, the sump pump system may utilize a sensor that is configured to detect motion or acceleration, such as an accelerometer or gyroscope. The sump pump system may identify a water level in a sump basin based on the detected motion or acceleration, which may be compared to a reading or expected signal from the sump pump system's "typical" sensor (e.g., float switch) that is used to detect one or more water levels. In this manner, the sump pump system may detect a malfunctioning level sensor that is used by the pump to detect high-water and low-water marks at which the sump pump activates and deactivates, respectively.

20 Claims, 3 Drawing Sheets

Related U.S. Application Data filed on Feb. 12, 2021, provisional application No. 63/148,885, filed on Feb. 12, 2021, provisional application No. 63/148,894, filed on Feb. 12, 2021, provisional application No. 63/148,909, filed on Feb. 12, 2021, provisional application No. 63/148,923, filed on Feb. 12, 2021, provisional application No. 63/148,926, filed on Feb. 12, 2021.

(51) Int. Cl.
*H04L 12/28* (2006.01)
*G08B 21/18* (2006.01)

(56) References Cited

U.S. PATENT DOCUMENTS

| | | |
|---|---|---|
| 5,672,050 A | 9/1997 | Webber et al. |
| 6,330,525 B1 | 12/2001 | Hays et al. |
| 6,676,382 B2 | 1/2004 | Leighton et al. |
| 7,309,216 B1 | 12/2007 | Spadola, Jr. et al. |
| 8,380,355 B2 * | 2/2013 | Mayleben ............ G01F 23/268 700/282 |
| 8,490,006 B1 | 7/2013 | Reeser et al. |
| 8,527,306 B1 | 9/2013 | Reeser et al. |
| 8,533,144 B1 | 9/2013 | Reeser et al. |
| 8,640,038 B1 | 1/2014 | Reeser et al. |
| 8,665,084 B2 | 3/2014 | Shapiro et al. |
| 8,890,680 B2 | 11/2014 | Reeser et al. |
| 8,892,263 B1 * | 11/2014 | Morris ................ G05D 7/0623 700/282 |
| 8,917,186 B1 | 12/2014 | Grant |
| 8,976,937 B2 | 3/2015 | Shapiro et al. |
| 9,049,168 B2 | 6/2015 | Jacob et al. |
| 9,057,746 B1 | 6/2015 | Houlette et al. |
| 9,117,349 B2 | 8/2015 | Shapiro et al. |
| 9,142,119 B1 | 9/2015 | Grant |
| 9,152,737 B1 | 10/2015 | Micali et al. |
| 9,183,578 B1 | 11/2015 | Reeser et al. |
| 9,202,363 B1 | 12/2015 | Grant |
| 9,262,909 B1 | 2/2016 | Grant |
| 9,274,530 B1 | 3/2016 | Morris |
| 9,286,772 B2 | 3/2016 | Shapiro et al. |
| 9,344,330 B2 | 5/2016 | Jacob et al. |
| 9,424,737 B2 | 8/2016 | Bailey et al. |
| 9,443,195 B2 | 9/2016 | Micali et al. |
| 9,472,092 B1 | 10/2016 | Grant |
| 9,589,441 B2 | 3/2017 | Shapiro et al. |
| 9,609,003 B1 | 3/2017 | Chmielewski et al. |
| 9,665,892 B1 | 5/2017 | Reeser et al. |
| 9,666,060 B2 | 5/2017 | Reeser et al. |
| 9,699,529 B1 | 7/2017 | Petri et al. |
| 9,739,813 B2 | 8/2017 | Houlette et al. |
| 9,786,158 B2 | 10/2017 | Beaver et al. |
| 9,798,979 B2 | 10/2017 | Fadell et al. |
| 9,798,993 B2 | 10/2017 | Payne et al. |
| 9,800,570 B1 | 10/2017 | Bleisch |
| 9,800,958 B1 | 10/2017 | Petri et al. |
| 9,812,001 B1 | 11/2017 | Grant |
| 9,888,371 B1 | 2/2018 | Jacob |
| 9,892,463 B1 | 2/2018 | Hakimi-Boushehri et al. |
| 9,898,168 B2 | 2/2018 | Shapiro et al. |
| 9,898,912 B1 | 2/2018 | Jordan, II et al. |
| 9,911,042 B1 | 3/2018 | Cardona et al. |
| 9,923,971 B2 | 3/2018 | Madey et al. |
| 9,942,630 B1 | 4/2018 | Petri et al. |
| 9,947,202 B1 | 4/2018 | Moon et al. |
| 9,978,033 B1 | 5/2018 | Payne et al. |
| 9,997,056 B2 | 6/2018 | Bleisch |
| 10,002,295 B1 | 6/2018 | Cardona et al. |
| 10,042,341 B1 | 8/2018 | Jacob |
| 10,047,974 B1 | 8/2018 | Riblet et al. |
| 10,055,793 B1 | 8/2018 | Call et al. |
| 10,055,803 B2 | 8/2018 | Orduna et al. |
| 10,057,664 B1 | 8/2018 | Moon et al. |
| 10,073,929 B2 | 9/2018 | Vaynriber et al. |
| 10,102,584 B1 | 10/2018 | Devereaux et al. |
| 10,102,585 B1 | 10/2018 | Bryant et al. |
| 10,107,708 B1 | 10/2018 | Schick et al. |
| 10,112,222 B1 | 10/2018 | Davis et al. |
| 10,142,394 B2 | 11/2018 | Chmielewski et al. |
| 10,176,705 B1 | 1/2019 | Grant |
| 10,181,160 B1 | 1/2019 | Hakimi-Boushehri et al. |
| 10,186,134 B1 | 1/2019 | Moon et al. |
| 10,198,771 B1 | 2/2019 | Madigan et al. |
| 10,217,068 B1 | 2/2019 | Davis et al. |
| 10,229,394 B1 | 3/2019 | Davis et al. |
| 10,244,294 B1 | 3/2019 | Moon et al. |
| 10,249,158 B1 | 4/2019 | Jordan, II et al. |
| 10,282,787 B1 | 5/2019 | Hakimi-Boushehri et al. |
| 10,282,788 B1 | 5/2019 | Jordan, II et al. |
| 10,282,961 B1 | 5/2019 | Jordan, II et al. |
| 10,295,431 B1 | 5/2019 | Schick et al. |
| 10,296,978 B1 | 5/2019 | Corder et al. |
| 10,297,138 B2 | 5/2019 | Reeser et al. |
| 10,304,313 B1 | 5/2019 | Moon et al. |
| 10,323,860 B1 | 6/2019 | Riblet et al. |
| 10,325,473 B1 | 6/2019 | Moon et al. |
| 10,332,059 B2 | 6/2019 | Matsuoka et al. |
| 10,346,811 B1 | 7/2019 | Jordan, II et al. |
| 10,353,359 B1 | 7/2019 | Jordan, II et al. |
| 10,356,303 B1 | 7/2019 | Jordan, II et al. |
| 10,387,966 B1 | 8/2019 | Shah et al. |
| 10,388,135 B1 | 8/2019 | Jordan, II et al. |
| 10,412,169 B1 | 9/2019 | Madey et al. |
| 10,446,000 B2 | 10/2019 | Friar et al. |
| 10,467,476 B1 | 11/2019 | Cardona et al. |
| 10,469,282 B1 | 11/2019 | Konrardy et al. |
| 10,480,825 B1 | 11/2019 | Riblet et al. |
| 10,482,746 B1 | 11/2019 | Moon et al. |
| 10,506,411 B1 | 12/2019 | Jacob |
| 10,514,669 B1 | 12/2019 | Call et al. |
| 10,515,372 B1 | 12/2019 | Jordan, II et al. |
| 10,522,009 B1 | 12/2019 | Jordan, II et al. |
| 10,546,478 B1 | 1/2020 | Moon et al. |
| 10,547,918 B1 | 1/2020 | Moon et al. |
| 10,565,541 B2 | 2/2020 | Payne et al. |
| 10,573,146 B1 | 2/2020 | Jordan, II et al. |
| 10,573,149 B1 | 2/2020 | Jordan, II et al. |
| 10,579,028 B1 | 3/2020 | Jacob |
| 10,586,177 B1 | 3/2020 | Choueiter et al. |
| 10,607,295 B1 | 3/2020 | Hakimi-Boushehri et al. |
| 10,634,576 B1 | 4/2020 | Schick et al. |
| 10,664,922 B1 | 5/2020 | Madigan et al. |
| 10,679,292 B1 | 6/2020 | Call et al. |
| 10,685,402 B1 | 6/2020 | Bryant et al. |
| 10,699,346 B1 | 6/2020 | Corder et al. |
| 10,699,348 B1 | 6/2020 | Devereaux et al. |
| 10,726,494 B1 | 7/2020 | Shah et al. |
| 10,726,500 B1 | 7/2020 | Shah et al. |
| 10,733,671 B1 | 8/2020 | Hakimi-Boushehri et al. |
| 10,733,868 B2 | 8/2020 | Moon et al. |
| 10,735,829 B2 | 8/2020 | Petri et al. |
| 10,740,691 B2 | 8/2020 | Choueiter et al. |
| 10,741,033 B1 | 8/2020 | Jordan et al. |
| 10,750,252 B2 | 8/2020 | Petri et al. |
| 10,795,329 B1 | 10/2020 | Jordan, II et al. |
| 10,796,557 B2 | 10/2020 | Sundermeyer et al. |
| 10,802,477 B1 | 10/2020 | Konrardy et al. |
| 10,804,700 B2 | 10/2020 | Cohen et al. |
| 10,818,105 B1 | 10/2020 | Konrardy et al. |
| 10,823,458 B1 | 11/2020 | Riblet et al. |
| 10,824,971 B1 | 11/2020 | Davis et al. |
| 10,825,320 B1 | 11/2020 | Moon et al. |
| 10,825,321 B2 | 11/2020 | Moon et al. |
| 10,832,225 B1 | 11/2020 | Davis et al. |
| 10,846,800 B1 | 11/2020 | Bryant et al. |
| 10,907,844 B2 | 2/2021 | Ribbich et al. |
| 10,922,756 B1 | 2/2021 | Call et al. |
| 10,922,948 B1 | 2/2021 | Moon et al. |
| 10,943,447 B1 | 3/2021 | Jordan, II et al. |
| 10,970,990 B1 | 4/2021 | Jacob |
| 10,990,069 B1 | 4/2021 | Jacob |
| 11,003,334 B1 | 5/2021 | Conway et al. |
| 11,004,320 B1 | 5/2021 | Jordan, II et al. |

(56) References Cited

U.S. PATENT DOCUMENTS

| | | |
|---|---|---|
| 11,015,997 B1 | 5/2021 | Schick et al. |
| 11,017,480 B2 | 5/2021 | Shah et al. |
| 11,042,137 B1 | 6/2021 | Call et al. |
| 11,042,942 B1 | 6/2021 | Hakimi-Boushehri et al. |
| 11,043,098 B1 | 6/2021 | Jordan, II et al. |
| 11,049,078 B1 | 6/2021 | Jordan, II et al. |
| 11,049,189 B2 | 6/2021 | Shah et al. |
| 11,074,659 B1 | 7/2021 | Hakimi-Boushehri et al. |
| 11,100,594 B1 | 8/2021 | West et al. |
| 11,118,812 B1 | 9/2021 | Riblet et al. |
| 11,126,708 B2 | 9/2021 | Reimer |
| 11,164,257 B1 | 11/2021 | Devereaux et al. |
| 11,232,873 B1 | 1/2022 | Aspro et al. |
| 11,277,465 B2 | 3/2022 | Chmielewski et al. |
| 11,348,193 B1 | 5/2022 | Konrardy et al. |
| 11,417,212 B1 | 8/2022 | Farooqui et al. |
| 2003/0049134 A1 | 3/2003 | Leighton et al. |
| 2004/0064012 A1 | 4/2004 | Yanai |
| 2004/0090197 A1 | 5/2004 | Schuchmann |
| 2004/0221647 A1 | 11/2004 | Sabatino |
| 2009/0074338 A1 | 3/2009 | Hagshenas et al. |
| 2009/0123295 A1 | 5/2009 | Abbott |
| 2009/0265193 A1 | 10/2009 | Collins et al. |
| 2011/0110794 A1 | 5/2011 | Mayleben et al. |
| 2011/0156921 A1 | 6/2011 | Kyllingstad |
| 2012/0260729 A1 | 10/2012 | Bayley et al. |
| 2013/0197700 A1 | 8/2013 | Kochan et al. |
| 2014/0202243 A1 | 7/2014 | Leonard et al. |
| 2014/0266669 A1 | 9/2014 | Fadell et al. |
| 2015/0061859 A1 | 3/2015 | Matsuoka et al. |
| 2015/0253216 A1 | 9/2015 | Shinoda et al. |
| 2015/0347910 A1 | 12/2015 | Fadell et al. |
| 2016/0333884 A1* | 11/2016 | Hussain .............. F04D 15/0236 |
| 2017/0075363 A1 | 3/2017 | Steinke |
| 2017/0100632 A1 | 4/2017 | Castelo Branco et al. |
| 2017/0322104 A1 | 11/2017 | Mataga et al. |
| 2017/0335550 A1 | 11/2017 | Sterling et al. |
| 2017/0342812 A1 | 11/2017 | Kuhn |
| 2018/0247513 A1 | 8/2018 | Calvert et al. |
| 2018/0363639 A1 | 12/2018 | Cathell et al. |
| 2018/0375680 A1 | 12/2018 | Wright et al. |
| 2019/0101427 A1 | 4/2019 | Beger et al. |
| 2019/0251520 A1 | 8/2019 | Bentley, III et al. |
| 2019/0353156 A1 | 11/2019 | Ward et al. |
| 2020/0003217 A1* | 1/2020 | Wilds .................. F04D 15/0016 |
| 2020/0302549 A1 | 9/2020 | Jordan, II et al. |
| 2020/0327791 A1 | 10/2020 | Moon et al. |
| 2021/0035432 A1 | 2/2021 | Moon et al. |
| 2021/0042843 A1 | 2/2021 | Bryant et al. |
| 2021/0158671 A1 | 5/2021 | Jordan, II et al. |
| 2021/0279811 A1 | 9/2021 | Waltman et al. |
| 2021/0312789 A1 | 10/2021 | Linn |
| 2022/0101275 A1 | 3/2022 | Aspro et al. |

FOREIGN PATENT DOCUMENTS

| | | | |
|---|---|---|---|
| JP | 2003157357 A | | 5/2003 |
| KR | 20150129845 A | | 11/2015 |
| WO | WO-2014159131 A2 | | 10/2014 |
| WO | WO-2016081511 A2 | | 5/2016 |
| WO | WO-2017173463 A1 | * | 10/2017 |
| WO | WO-2021087185 A1 | | 5/2021 |

OTHER PUBLICATIONS

APG, Automation Products Group, Inc., "5 Tips on Using an Ultrasonic Level Sensor in a Lift Station," Retrieved from the Internet at: <http://romtecutilities.com/pressure-transducers-for-pump-lift-stations/> on Apr. 26, 2021.

Flowline™, "Municipal Sewer Pump Station Radar Level Sensor," Retrieved from the Internet at: <https://www.flowline.com/municipal-sewer-lift-station-radar-level-transmitter/> on Apr. 26, 2021.

LevelGuard, Fluid Control Products, "Reliable Liquid Level Sensing Solutions," Retrieved from the Internet at: <https://www.levelguardproducts.com/> on Apr. 26, 2021.

Romtec Utilities, "Pressure Transducers for Pump & Lift Stations," Retrieved from the Internet at: <https://www.flowline.com/municipal-sewer-lift-station-radar-level-transmitter/> on Apr. 26, 2021.

The Basement Watchdog, "Connected Pumps," Retrieved from the Internet at: <https://www.adafruit.com/product/3619> on Apr. 26, 2021.

The Home Depot, "1/2 HP Submersible 12-Volt DC WiFi Connected Battery Backup Sump Pump and Monitoring System," Retrieved from the Internet at: <https://www.homedepot.com/p/PumpSpy-1-2-HP-Submersible-12-Volt-DC-WiFi-Connected-Battery-Backup-Sump-Pump-and-Monitoring-System-PS2000/310520482> on Apr. 26, 2021.

* cited by examiner

DETECTING AND UTILIZING WATER VIBRATIONS IN SUMP PUMP SYSTEM CONTROL

CROSS-REFERENCE TO RELATED APPLICATIONS

This application claims priority to (i) U.S. Provisional Application Ser. No. 63/148,783, filed Feb. 12, 2021, entitled "DETECTING AND UTILIZING A RISE RATE FOR SUMP PUMP SYSTEM CONTROL," (ii) U.S. Provisional Application Ser. No. 63/148,880, filed Feb. 12, 2021, entitled "DETECTING AND UTILIZING WATER VIBRATIONS IN SUMP PUMP SYSTEM CONTROL," (iii) U.S. Provisional Application Ser. No. 63/148,885, filed Feb. 12, 2021, entitled "DETECTING AND UTILIZING VIBRATION PATTERNS OF SUMP PUMPS," (iv) U.S. Provisional Application Ser. No. 63/148,894, filed Feb. 12, 2021, entitled "ADAPTIVE LEARNING SYSTEM FOR IMPROVING SUMP PUMP CONTROL," (v) U.S. Provisional Application Ser. No. 63/148,909, filed Feb. 12, 2021, entitled "DETERMINING AND UTILIZING A DESIRED FREQUENCY FOR A MECHANICAL SHAKER FOR A SUMP PUMP SYSTEM," (vi) U.S. Provisional Application Ser. No. 63/148,923, filed Feb. 12, 2021, entitled "SYSTEMS AND METHODS FOR MANIPULATING CONTROL OF SUMP PUMPS TO EXTEND LIFESPANS OF SUMP PUMPS," and (vii) U.S. Provisional Application Ser. No. 63/148,926, filed Feb. 12, 2021, entitled "SUMP PUMP SMART HOME INTEGRATION," the entire disclosures of which are expressly incorporated herein by reference.

TECHNICAL FIELD

The present disclosure generally relates to a sump pump system, and, more specifically, to techniques for determining and utilizing motion of water in sump basins when implementing control of a sump pump.

BACKGROUND

A sump pump is a type of pump used to remove water that has accumulated in a lower level (e.g., a basement, a ground floor level, a sub-ground floor level, etc.) of a property (e.g., a home, an office, or any other building or structure). The sump pump sends the water into pipes that lead away from the property so that potential lower-level flooding may be avoided. As such, failures in the sump pump can have disastrous consequences including water damages and insurance losses. However, sump pump failures often occur without prior warning or may not be discovered until significant damage has already been done. Unfortunately, many currently available sump pump systems are not designed or equipped to automatically detect impending sump pump failures, or remedy such failures even if they are detected.

SUMMARY

The described methods and systems enable the detection and utilization of motion of water in sump basins when implementing control of sump pumps. A sump pump system may implement the described techniques to detect a malfunctioning level sensor that is used by the pump to detect high-water and low-water marks at which the sump pump activates and deactivates, respectively.

In an embodiment, system detects and utilizes motion of water in sump basins when implementing control of sump pumps. The system may comprise a sump pump that is disposed in a sump basin and configured to pump water out of the sump basin via an outlet pipe. The sump pump may include a first sensor (e.g., a float switch) that is configured to detect water levels in a sump basin, wherein the sump pump is configured to activate and deactivate based on an output from the first sensor representing the detected water levels (e.g., at high-water and low-water marks). The system may comprise a second sensor that is configured to be disposed on or within water in the sump basin. The second sensor (e.g., a force sensor or accelerometer) may be configured to detect motion or acceleration. The system may comprise a sump pump control system communicatively coupled to the sump pump and to the second sensor. The sump pump control system may be configured to: detect, via the second sensor, acceleration data representing detected acceleration of the second sensor; analyze the acceleration data to estimate a water level that is indicative of a potential fault in the first sensor; and/or in response to estimating that the water level indicative of the potential fault in the first sensor has been exceeded, activate the sump pump.

In an embodiment, a method is implemented to detect and utilize motion of water in sump basins when implementing control of sump pumps. The method may comprise implementing a sump pump including a first sensor that is configured to detect water levels in a sump basin, wherein the sump pump is configured to activate and deactivate based on an output from the first sensor representing the water levels; detecting, via a second sensor that is configured to be disposed on or within water in the sump basin, acceleration of the second sensor and generating acceleration data representing the detected acceleration; analyzing the acceleration data to estimate a water level that is indicative of a potential fault in the first sensor; and/or in response to estimating that the water level indicative of the potential fault in the first sensor has been exceeded, activating the sump pump.

Note, this summary has been provided to introduce a selection of concepts further described below in the detailed description. As explained in the detailed description, certain embodiments may include features and advantages not described in this summary, and certain embodiment may omit one or more features or advantages described in this summary.

BRIEF DESCRIPTION OF THE DRAWINGS

Each of the figures described below depicts one or more aspects of the disclosed system(s) or method(s), according to an embodiment. The detailed description refers to reference numerals included in the following figures.

DETAILED DESCRIPTION

Figure 1:
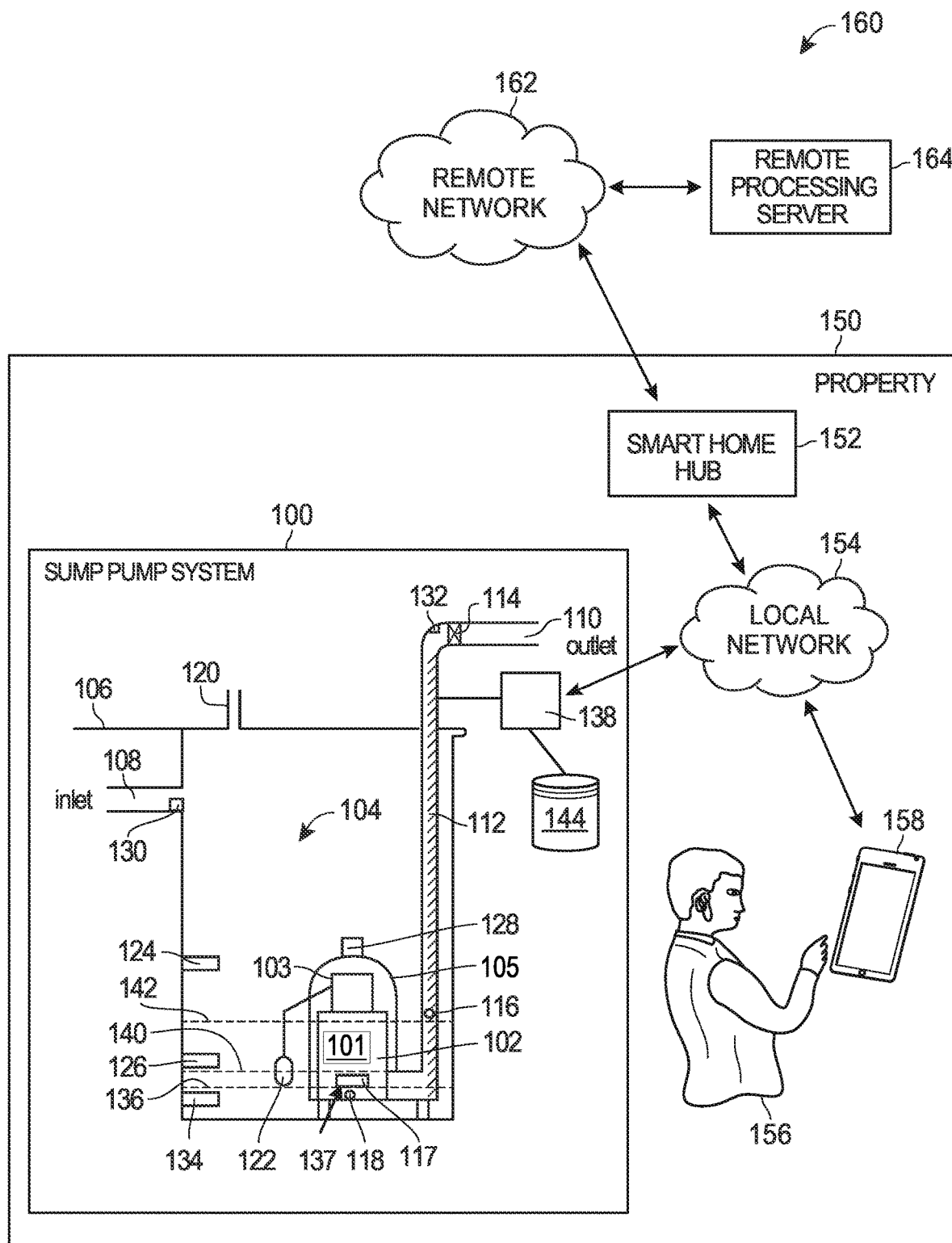
FIG. 1 illustrates an example sump pump system constructed in accordance with disclosed embodiments, and shown in an example sump pump network system.

The described techniques enable a sump pump system to detect and utilize motion of water in sump basins when implementing control of sump pumps. A sump pump system may detect a malfunctioning level sensor that is used by the pump to detect high-water and low-water marks at which the sump pump activates and deactivates, respectively. By contrast, most sump pump systems do not utilize sensors capable of detecting a malfunction of a typical float sensor in a sump pump. As a result, float sensors represent a single point of failure in many sump pump systems. If the float sensor gets "stuck" while disengaged or deactivated, for example, the sump pump may fail to detect a high-water mark in the sump basin, resulting in the sump pump failing to activate or engage when one would typically expect, resulting in the sump basin overflowing (and potentially resulting in flooding a basement in which the sump pump is installed, potentially leading to costly water damage to walls, floors, furniture, electronics, etc.). Alternatively, if the float sensor becomes "stuck" after activating or engaging, the sump pump may continuously run. While this may prevent an overflow of the sump basin in the short-term, the sump pump motor may quickly burn out if this condition is not corrected. And at that point, the sump basin is obviously at risk of overflowing.

At a high level, a system implementing the described techniques relies on sensor(s) configured to detect motion (e.g., acceleration), which can be analyzed to calculate water rise rates. These sensors may be accelerometers, gyroscopes, inertial measurement units (IMUs), or force acceleration sensors. Generally speaking, the sensor(s) may be disposed on or within the water, and may be responsive to the water such that, when the water level rises or drops, the sensor(s) responsively and proportionally drop. Accordingly, one may use a technique akin to dead-reckoning, in which relative changes in the water level are detected for the purpose of approximating the water level in the sump basin. Alternatively or additionally, the data from these sensors that detect motion or acceleration may be analyzed, for example, to identify acceleration or vibration patterns that correspond to certain water levels.

Generally speaking, sump pumps are used in areas where lower level (e.g., ground level or below ground level) flooding may be a problem and/or is a recurring problem. A typical sump pump system comprises a submersible impeller type pump disposed in a sump basin. The sump basin is a holding cavity formed by digging a recess into the floor of a lower level of a property, such as a ground level or below ground level (e.g., a basement) of a property (e.g., a home, an office, or any other building or structure). The sump basin acts both to house the sump pump and to collect accumulated water. Water may accumulate in the sump basin when excessive amounts of rain, snow melt or ground water saturate the soil adjacent to the property and/or property lower level floor. Water may also enter the sump basin via drainage or inlet pipes that have been placed into the ground to divert any excess water into the sump basin before the water can begin to permeate foundation walls, floors, etc., or water may enter the sump basin through porous or cracked walls, floors, etc. Generally speaking, the sump basin is installed in a basement such that the top of the sump basin is lower than the lowest floor level in the basement. Accordingly, when the water table underneath and around the property rises, water flows into the sump basin to then be pumped away from the area, thereby avoiding the water table rising above the basement floor (which can result in leaks and flooding due to the typically porous nature of basement walls). In any event, after the sump pump basin fills and the water reaches a high-water mark, the sump pumping action of a sump pump removes the accumulated water in the sump basin via one or more outlet or discharge pipes that carries the pumped water to an area away from the property (such as into a municipal storm drain, a dry well, a water retention area, etc.), thereby avoiding potential flooding inside the building. Ideally, the sump basin fills and empties at a rate fast enough to prevent the water table from rising above the basement floor.

Turning to the figures, FIG. 1 illustrates an example sump pump system 100 that can be used to remove water accumulated in a lower level of a property 150 (e.g., a home, an office, or any other building or structure). As shown in FIG. 1, the sump pump system 100 may be part of an example sump pump network system 160.

The example sump pump system 100 includes a sump pump 102 located in a sump basin 104. The sump pump 102 and a sump pump motor 103 are enclosed in a housing 105. The sump pump motor 103 may also be referred to herein as the motor 103, and the sump pump 102 may also be referred to herein as the pump 102. While the sump pump 102 in FIG. 1 is shown as a submersible type sump pump (e.g., where the motor 103 and the sump pump 102 are mounted inside the basin 104), the sump pump 102, in general, may be any type of sump pump, such as a pedestal type sump pump that is mounted above or outside of the basin 104. As shown in FIG. 1, the sump basin 104 is a well-like cavity or hole formed through a floor 106 of the property 150. The example sump pump system 100 also includes a water inlet pipe 108 terminating at the sump basin 104, and a discharge pipe 112 (also referred to herein as an outlet pipe) connected to the sump pump 102 to carry water out of the sump basin 104. An impeller 117 of the sump pump 102 draws in water through an inlet 118, and pumps the water up the discharge pipe 112 to an outlet 110. In the illustrated example, the discharge pipe 112 extends upward from the sump pump 102 and then out of the building. However, other arrangements may be used. The discharge pipe 112 is outfitted with a check valve 114. The check valve 114 allows water to flow up through the discharge pipe 112, but does not allow the water in the discharge pipe 112 to flow back into the sump basin 104 when the sump pump 102 is off. A weep hole 116 in the discharge pipe 112 allows excess air to escape from the pipe, preventing air binding, also known as air locking. The opening of the sump basin 104 may be protected by a cover to prevent objects from falling into the basin, and to keep noxious gases (e.g., radon) from entering the property 150. In the case of a sealed sump pump basin 104, an air vent 120 may be needed to relieve excess air pressure in the basin.

Generally, the sump pump 102 may be electrically powered and hardwired into the electrical system of the property 150. Additionally and/or alternatively, the sump pump 102 may be powered by a battery or other independent power source (not shown for clarity of illustration). The operation of the sump pump 102 is controlled by a pump activation switch 122 in response to a water level in the basin 104. For example, the sump activation switch 122 may activate the sump pump 102 when a water level in the sump basin 104 reaches a preset level. The preset level is determined by the placement of the sump pump activation switch 122. In illustrated example of FIG. 1, the sump pump activation switch 122 is shown in the form of a float switch, although other technologies such as liquid level sensors may also be used.

As shown in FIG. 1, the sump pump activation switch 122 is connected to the motor 103 of the sump pump 102. In some embodiments, the sump pump activation switch 122 is a level sensor, such as a float switch. When the rising water in the basin 104 lifts a float of the sump pump activation switch 122 to a high water level or mark 142, the float rises a rod, which activates and/or energizes the motor 103 to begin pumping water. In other embodiments, the sump pump activation switch 122 may be a mercury tilt switch. The rising water in the basin 104 lifts and tilts a float of the sump pump activation switch 122 and, when the float reaches the high water level or mark 142, a sufficient tilt causes a small amount of liquid mercury to slide towards open electrodes to close an electrical circuit, which activates and/or energizes the motor 103. As water is pumped out of the sump basin 104, the water level drops to a low or initial water level or mark 140. The falling water level carries the sump pump activation switch 122 back to an initial or low water level or mark 140, at which the sump pump activation switch 122 is deactivated. Thus, the motor 103 de-energizes or shuts off at the initial or low water level or mark 140.

When the sump pump 102 and/or the motor 103 fails, flooding may ensue as water fills up the sump basin 104 and overflows above the floor level 106 of the property 150. The amount of water that overflows can vary from a few inches to several feet, which may result in substantial water damage to the structures of property 150, as well as personal belongings. Accordingly, the ability to maintain sump pumps, and to detect and resolve impending sump pump failures before they occur is of great importance to the property owners and the building and property insuring parties.

The sump pump 102 may fail because of a failure in the motor 103, which renders the entire sump pump 102 inoperable. The failure in the motor 103 may be caused by various factors such as age, fatigue, overheating, poor maintenance, etc. Aside from the failure of the motor 103, the sump pump 102 may fail because of other soft mechanical failures of the components of the sump pump system 100. For example, sediment or debris build-up may cause the motor impeller 117 and/or another sump pump component to stall, thus, rendering the sump pump 102 unable to pump water even though the motor 103 is operational. Additionally or alternatively, the sump pump activation switch 122 may fail to engage in response to the rising water level and subsequently fail to actuate the motor 103. Additionally or alternatively, the check valve 114 may malfunction, and back flow of the discharged water into the sump pump basin 104 may equal or exceed the amount of water being pumped out by the sump pump 102. Additionally or alternatively, there might be a blockage in the discharge pipe 112, preventing water flow to the outlet 110. Additionally and/or alternatively, an air pocket may cause the sump pump 102 to run dry. As such, mechanisms to maintain the sump pump and/or detect impending sump pump failures may include monitoring for the occurrence of such failures.

Generally, soft mechanical failures may be identified or detected indirectly. In an embodiment, soft mechanical failures may be detected by using properly placed sensors, such as sensors 124, 126, 128, 130, 132, and 134 of FIG. 1, able to detect issues associated with failures of the sump pump system 100. The sensors 124, 126, 128, 130, 132, and 134 may be configured to communicate with a sump pump controller 138, which may be configured to communicate with other components of the sump pump system 100, or components of a sump pump network system 160, described below. The sump pump controller 138 may also be referred to in this specification as the controller 138. The controller 138 is configured to receive and analyze data from the sensors 124, 126, 128, 130, 132, and 134 using built-in computing capabilities or in cooperation with other computing devices of the sump pump network system 160 to identify specific failures of the sump pump system 100, and in some instances remediate the issues, and/or generate an alert regarding the detected failures. Interactions between the sensors 124, 126, 128, 130, 132, and 134, the controller 138, and the components of the system 160 are discussed below in more detail.

Example remedies to soft mechanical failures (such as a blockage or stuck impeller) may include activating a shaker, altering a speed of a pump impeller, reversing a direction of spin of the pump impeller, gradually accelerating the impeller, or alternating gradual accelerations of the impeller with gradual decelerations. If desired, the sump pump system 100 may include a variable speed motor or controller for the sump pump 102. In an embodiment, the sump pump motor 103 is a variable speed motor; in an embodiment, it is not. Similarly, in an embodiment, the sump pump controller 138 is a variable speed controller; in an embodiment, it is not.

For example, in embodiments in which the pump impeller is reversed or adjusted in speed, a variable speed motor or controller may be included for controlling the pump and/or pump impeller in such a manner. In some embodiments, a variable speed motor or controller may detect a blocked impeller by sensing that the position of the rotor or impeller is not changing even though power is applied. To dislodge the mechanical blockage, the controller may spin the motor in reverse direction or alternate gradual acceleration with gradual deceleration in opposite directions. Gradual acceleration upon motor activation and gradual deceleration upon motor disengagement may reduce initial step level force impact of the pump turning on or off, which may benefit the system by lengthening the serviceable life of the motor and the marginal pipe infrastructure.

As shown in FIG. 1, the sump pump system 100 may include a variety of mechanical, electrical, optical, or any other suitable sensors 124, 126, 128, 130, 132, and 134 disposed within, at, throughout, embedded within, or in mechanical connection to the sump basin 104, the sump pump housing 105, the inlet pipe 108, or the discharge pipe 112. Additionally, the sensors 124, 126, 128, 130, 132, and 134 may be disposed on, at, or within the motor 103, the sump pump 102, or any other components of the sump pump system 100. The one or more sensors 124, 126, 128, 130, 132, and 134 may transduce one or more of: light, sound, acceleration, translational or rotational movement, strain, pressure, presence of liquid, or other suitable signals into electrical signals. The sensors 124, 126, 128, 130, 132, and 134 may be acoustic, photonic, micro-electro-mechanical systems (MEMS) sensors, or any other suitable type of sensor.

The sensor 124 may be a water level sensor, placed a short distance (e.g., 10, 20, 30, or 50 mm above) above the high water level or mark 142 in the sump basin 104. In operation, if the water level sensor 124 does not detect water, then the water level in the basin 104 is deemed adequate. In other words, the sump pump 102 is either working properly to constantly pump water out of the basin 104, or the water level is not yet high enough to activate the sump pump 102. In any event, it can be assumed that the sump pump 102 is not experiencing any soft mechanical failure. On the other hand, if the water level sensor 124 detects water, then water may be on the rise in the basin 104, and may overflow the sump basin 104. In other words, a dangerous level of water is present in the sump basin 104, which may be due to either a failure of the sump pump 102, a failure to activate the sump pump 102, and/or a soft mechanical failure that has rendered the sump pump 102 unable to pump out adequate amount of water.

The sensor 124 may include magnetic or mechanical floats, pressure sensors, optical, ultrasonic, radar, capacitance, electroconductive and/or electrostatic sensors. The sensor 124 may be a continuous or a point level switch. A continuous liquid level switch or sensor provides a continuous feedback showing liquid level within a specified range. A point level switch detects whether a liquid level is above or below a certain sensing point. In embodiments, the sensor 124 may be a reed switch, or a mercury switch, a conductive level sensor, and/or any type of a suitable switch that changes a state from inactive to active as liquid level reaches a certain level relative to the switch position.

In some embodiments, the sensor 124 may be a continuous liquid level switch providing a measurement of the height of the water level inside the sump basin 104. The controller 138 can use these measurements, taken at time intervals (e.g., at 1, 5, or 10 second intervals), to estimate the volume of water being pumped, deposited, or backflowing in the sump basin 104. For example, knowing the sump pump basin 104 dimensions, such as a diameter (if the basin is a cylinder), or the bottom diameter, a top diameter, and a height (if the basin is a graduated cylinder) or width and length measurements (if the basin is a rectangular prism), and water level height over time will yield a measurement of water volume increase or decrease over time. The controller 138 may utilize any suitable volume formula to calculate changes in volume (e.g., volume=$\pi r^2 h$ for a cylinder). For example, if the basin 104 is a cylinder basin, the controller 138 may be programmed to assume a known radius (e.g., 8 inches). The controller 138 may identify the distance from the bottom of the basin 104 to the water level (e.g., based on a water level sensor). This distance may be used for the "h" variable in the volume formula, enabling the controller 138 to calculate volume at any given time it can detect the "height" of the water level. In some instances, the controller 138 may be configured to account for displacement that occurs due to the pump itself being submerged within water. For example, a known volume of the pump (which is generally static) may be subtracted from a formula that assumes a perfect cylinder.

Additionally, knowing the sump basin 104 capacity (e.g., in gallons) and water volume increase over time, the controller 138 may calculate an estimate of when the sump pump basin may overflow. For example, in a sump basin with a capacity of 26 gallons and an initial water volume of 0 gallons, the controller 138 may calculate that a water volume increase at 0.1 gallons per second would result in a sump basin overflow in 260 seconds or 4 minutes and 20 seconds. The sump pump controller 138 may generate an alert, communicating an approximated time of the critical event of the sump basin 104 overflowing, or communicating the time (e.g., in minutes or seconds) remaining until the estimated overflow.

Additionally, functions of the sump pump controller 138 of FIG. 1 may be used together with the water level sensor 124 to detect certain soft mechanical failures, such as when the sump motor 103 becomes stuck and runs indefinitely. This may be due to a mechanical malfunction of the sump pump activation switch 122 or another activation element. In this scenario, when the water level sensor 124 does not detect water, the sump pump controller 138 may analyze the electrical load waveform of the motor 103 to determine how long the motor 103 is running. In general, if the sump pump 102 is working properly, then the motor 103 will automatically shut off when the falling water carries the sump pump activation switch 122 back to the initial or low level or mark 140. However, if the sump pump activation switch 122 jams or otherwise fails, then the sump motor 103 may become stuck and continue to run for a long time. Thus, if the water level sensor 124 is not detecting water but the sump pump controller 138 is detecting a long period of run time on the part of the sump motor 103 (e.g., if the run time of the sump motor 103 exceeds a certain length of time), then the sump pump 102 may be deemed to be experiencing a soft mechanical failure.

The sensor 126 may be a force sensor or transducer, configured to detect a water rise or fall rate in the sump basin 104, or water disturbance (e.g., splashing) in the sump basin 104. The sensor 126 may be, for example a piezoelectric crystal, a pneumatic, a hydraulic, an inductive, a capacitive, a magnetostrictive, or a strain gage load cell, or an accelerometer, or any other suitable sensor capable of transducing a force into an electrical signal. In an embodiment, an accelerometer of the sensor 126 measures inertial acceleration, from which water rise rate in the sump basin 104 can be determined.

The sensor 126 may be placed above the initial or low water level or mark 140 and, for example, below the high water level or mark 142 in the sump basin 104. Alternatively, the sensor 126 may be placed above the high water level or mark 142 in the sump basin 104.

In operation, a rising water level in the sump basin 104 would exert a load on the sensor 126, from which a rise or fall rate of the water level in the sump basin 104 can be determined. If the sensor 126 does not detect any force exerted on it, there may be no water at the level of the sensor 126. Alternatively, the water level at the sensor 126 in the sump basin 104 may be constant. In other words, water rise rate, or inflow rate may equal the rate of water pumped out through the discharge pipe 112 by the sump pump 102. In an alternative scenario, the sensor 126 may sense an upward force of the rising water level when the sump pump 102 is operational, and an inlet sensor 130 (described later in more detail) detects water entering the sump basin 104 from the inlet 108, indicating that the inflow rate is greater than the rate of water pumped out through the discharge pipe 112 by the sump pump 102. In yet another scenario, the sensor 126 may sense rising water, the inlet sensor 130 may not detect any water inflow into the sump basin 104, and at the same time the sump pump 102 may be engaged, the scenario indicating that the water level is rising due to additional inflow (e.g., back flow from the discharge pipe, or the vent 120, or through the floor 106 opening of an uncovered sump basin).

The sump pump system 100 may include a vibration sensor 128, placed in direct or indirect contact with the sump pump 102 or pump motor 103. FIG. 1 shows the vibration sensor 128 located on the sump pump housing 105. In some embodiments, the vibration sensor 128 may be placed on the motor 103, the sump pump 102, the discharge pipe 112, or on any component within the sump basin 104. The vibration sensor 128 may be a ceramic piezoelectric sensor, or any suitable sensor capable of detecting vibration or acceleration of motion of a structure. In operation, by measuring the inertial vibration, the vibration sensor 128 monitors the condition, predicts or monitors wear, fatigue, and failure of the sump pump system 100 components, for example sump pump 102, the motor 103, the housing 105, or the discharge pipe 112 and their respective constituents by measuring their vibrational signatures and, thus, determining the kinetic energy and forces acting upon the components. The inertial vibration signatures, when compared to a standard or when monitored for changes over time, may predict wear, impending failures, and immediate failures, such as a loose bearing, a stuck motor 103, an overloaded motor 103, a dry motor 103, a damaged discharge pipe 112, a faulty check valve 114, a broken hermetic seal of the housing 105, a stuck impeller 117, debris on the impeller 117 or inside the sump pump 102, etc.

The inlet sensor 130 and the outlet sensor 132 of the sump pump system 100 may be water level sensors, analogous to the water level sensor 124. In operation, the sensor 130 detects presence of water in the inlet pipe 108, or inflow. If the sensor 130 does not detect water in the inlet pipe 108, there is no water flowing into the sump basin 104 via the inlet pipe 108. FIG. 1 shows the sensor 130 placed on the surface of the inlet pipe 108. In some embodiments, the sensor 130 may be embedded within the water inlet pipe 108, or placed at the junction of the inlet pipe 108 and the wall of the sump basin 104. In some embodiments, the sensor 130 may include a hinged flap or a hinged lid (not shown) covering the opening of the inlet pipe 108. When the pressure of the inflowing water lifts the flap, the displacement of the flap triggers a signal that water is flowing into the sump basin 104 via the inlet pipe 108. The flap displacement may be registered, for example, in the hinge mechanism (e.g., by breaking or establishing an electrical connection by the movement of the hinge parts), or as a disconnected electrical or a magnetic connection between the flap and the inlet pipe 108 or the wall of the sump basin 104. Alternatively, the sensor 130 may be a sensor configured to detect deflection of the flap (e.g., with a laser-based or an acoustic technology).

The outlet sensor 132 detects presence of water in the discharge pipe 112 before the check valve 114, monitoring whether the check valve 114 is working properly, i.e., preventing the back flow of water into the sump basin 104 when the motor 103 is disengaged and the sump pump 102 is not operating. FIG. 1 shows the sensor 132 placed inside the discharge pipe 112 before, or closer to the sump pump 102 than the check valve 114. In operation, if the sensor 132 does not detect water when the sump pump 102 is deactivated, then the check valve 114 may be assumed to be functioning properly.

The sensor 134 may be a water level sensor, placed at a level or mark 136 in the sump basin 104 corresponding to the bottom 137 of the impeller 117 and/or another sump pump component of the sump pump 102, which is below the low or initial water level or mark 140. In operation, if the sensor 134 does not detect water, then the current water level in the basin 104 may be deemed adequately low to avoid, prevent, reduce, etc. corrosion of the impeller 117 and/or another sump pump component due to standing water in the sump basin 104. On the other hand, if the water level sensor 134 detects water, then at least a portion of the impeller 117 and/or another sump pump component may be currently exposed to water and a condition for potential corrosion may exist. Alternatively, the sensor 134 may be a force sensor or transducer and configured to detect a water rise or fall rate, water movement (e.g., a disturbance, splashing, sloshing, ripples, etc.) in the sump basin 104 due to the sump pump 102 running, etc. at the level or mark 136.

The sensor 134 may include magnetic or mechanical floats, pressure sensors, optical, ultrasonic, radar, capacitance, electroconductive or electrostatic sensors. The sensor 134 may be a continuous or a point level switch. A continuous liquid level switch or sensor provides a continuous feedback showing liquid level within a specified range. A point level switch detects whether a liquid level is above or below a certain sensing point. In some embodiments, the sensor 134 may be a reed switch, or a mercury switch, a conductive level sensor, or any type of a suitable switch that changes a state from inactive to active as liquid level reaches a certain level relative to the switch position.

Each of the sensors 124, 126, 128, 130, 132, and 134 may include one or more associated circuits, as well as packaging elements. The sensors 124, 126, 128, 130, 132, and 134 may be electrically or communicatively connected with each other (e.g., via one or more busses or links, power lines, etc.), and may cooperate to enable "smart" functionality described within this disclosure.

The sump pump system 100 may include a mechanical shaker 101 that is physically attached to the sump pump 102 and/or the discharge pipe 112. When engaged, the shaker 101 vibrates at a given frequency for the purpose of transferring motion to the sump pump 102 or the discharge pipe 112 in order to cause the pump 102 or the discharge pipe 112 to vibrate in a manner sufficient to "break loose" a blockage that is blocking the impeller 117 or the pipe 112. The mechanical shaker 101 may be in the form of an electromechanical vibration device (e.g. a linear motor) that physically agitates or shakes the sump pump. The intensity and duration of the vibration produced by the mechanical shaker 101 may be set or adjusted as desired. For example, the mechanical shaker 101 may be set to vibrate intensely and continuously for a short burst of time. As another example, the mechanical shaker 101 may be set to vibrate in multiple operating cycles (e.g., 3 or 5 cycles), with each cycle producing a different level of vibration intensity (e.g., an increase in the level of intensity going from the first cycle to the last cycle). Further, different types of vibration profiles may be specified such as a sine sweep, random vibration, synthesized shock, etc. The mechanical shaker 101 may be a standalone unit that may be retrofitted or added to the sump pump 102. In some embodiments, the mechanical shaker 101 may be integrated with or be part of the sump pump 102. Further, both the mechanical shaker 101 and the water level sensor(s) in the system 100 may be connected to the controller 138 so that the controller 138 can control the operation of the mechanical shaker 101 and the water level sensor(s).

The mechanical shaker 101 may be automatically activated in response to detected soft mechanical failures, such as when water overflow is detected by water level sensor or when the motor 103 runs too long in the absence of any water overflow detection. The mechanical shaker 101 may also be automatically activated in response to the controller 138 detecting potential problems with the motor 103. For example, the controller 138 may detect a vibration or acceleration pattern (e.g., of the water or of the sump pump or sump pipe) indicative of a problem (e.g., a blockage), and may respond by activating the shaker 101.

In some examples, the sump pump controller 138 maintains, tests, etc. the sump pump system 100 by periodically (e.g., every 14 days) running the motor 103 for at least a short duration (e.g., 30 seconds), regardless of the amount of water in the sump basin 104.

To reduce, avoid, prevent, etc. corrosion of the impeller 117 due to extended exposure of the impeller 117 to standing, potentially dirty water, in some examples, the sump pump controller 138 periodically activates the motor 103 (e.g., every 14 days) until the level of water in the sump basin 104 as detected by, for example, the sensor 134 is below the bottom 137 of the impeller 117. When the sensor 134 is a level sensor, the level of water in the sump basin 104 may be detected as being below the impeller 117 when the sensor 134 fails to sense any water. When the sensor 134 is a force sensor, the level of water in the sump basin 104 may be detected as above the bottom 137 of the impeller 117 when the sensor 134 senses a falling water level, water movement (e.g., sloshing, splashing, ripples, etc.) due to pump vibrations, etc.

Additionally and/or alternatively, following a water event, the sump pump controller 138 runs the motor 103 until a current level of the water in the sump basin 104 as detected by, for example, the sensor 134 is below the bottom 137 of the impeller 117 and/or another sump pump component. Example water events include, but are not limited to, a storm, a flood, a plumbing failure, etc. that initially causes an initial inrush of incoming water, followed by a slower flow of incoming water. An example method of detecting a water event includes: (i) during a first time period, detecting that a rate at which water is rising in the sump basin exceeds a first threshold; (ii) during a second, later time period, detecting that a rate at which water is rising in the sump basin 104 is less than a second, lower threshold; and (iii) optionally detecting that water has stopped rising in the sump basin. In some examples, the force sensor 126 is configured to determine the water rise rate in the sump basin 104. The rate at which water is rising in the sump basin 104 may, additionally and/or alternatively, be determined by counting the number of activations of the motor 103 in a period of time to, for example, maintain a current level of water in the sump basin 104 below the water level or mark 142.

As shown in the illustrated example of FIG. 1, the sump pump controller 138 and/or, more generally, the sump pump system 100, may be a smart device that is part of the sump pump network system 160. However, the sump pump controller 138 and/or, more generally, the sump pump system 100 may, additionally and/or alternatively, operate as a standalone system.

The sump pump controller 138 may convey data, updates, alerts, etc. related to the sump pump system 100 to a smart home hub 152 at the property 150 via any number and/or type(s) of local network(s) 154. The smart home hub 152 may connect to smart home devices (e.g., the sump pump controller 138, the sump pump system 100, doorbells, lights, locks, security cameras, thermostats, etc.) to enable a user 156 (e.g., a homeowner) to install, configure, control, monitor, etc. such devices via an electronic device 158, such as a smartphone, a tablet, a personal computer, or any other computing device. In some embodiments, the smart home hub 152 may send alerts, updates, notifications, etc. when certain conditions occur (e.g., when the sump pump controller 138 detects potential failure conditions) to the user 156 via their electronic device 158. Additionally and/or alternatively, alerts, status updates, notifications, etc. may be provided remotely via any number and/or type(s) of remote network(s) 162, such as the Internet. Thus, the user 156 may receive alerts, status updates, notifications, etc. via their electronic device 158 both when they are at the property 150 and when they are away. Moreover, alerts, status updates, notifications, etc. may be sent to a remote processing server 164 (e.g., a server or servers associated with insurance provider or providers) via the remote network(s) 162 for remote monitoring, control, etc.

While examples disclosed herein are described with reference to the sump pump controller 138 receiving and processing data from the sensors 124, 126, 128, 130, 132 and 134 to maintain and/or detect failures of the sump pump system 100, additionally and/or alternatively, data from the sensors 124, 126, 128, 130, 132 and 134 may be sent to the remote processing server 164 for processing to control, maintain and/or detect failures of the sump pump system 100, etc. In some examples, the remote processing server 164 may be part of security system monitoring server.

In some examples, data from the sensors 124, 126, 128, 130, 132 and 134, and/or alerts, status updates, notifications, trends, etc. determined by the sump pump controller 138 are stored in a cache, datastore, memory, etc. 144 for subsequent recall.

While the example sump pump controller 138 and/or, more generally, the example sump pump system 100 for monitoring sump pumps for failures and/or maintaining sump pumps are illustrated in FIG. 1, one or more of the elements, processes, devices and/or systems illustrated in FIG. 1 may be combined, divided, re-arranged, omitted, eliminated or implemented in any other way. Further, the sump pump controller 138 and/or, more generally, the sump pump system 100 may include one or more elements, processes, devices and/or systems in addition to, or instead of, those illustrated in FIG. 1, and/or may include more than one of any or all of the illustrated elements, processes, devices and/or systems.

Figure 2:
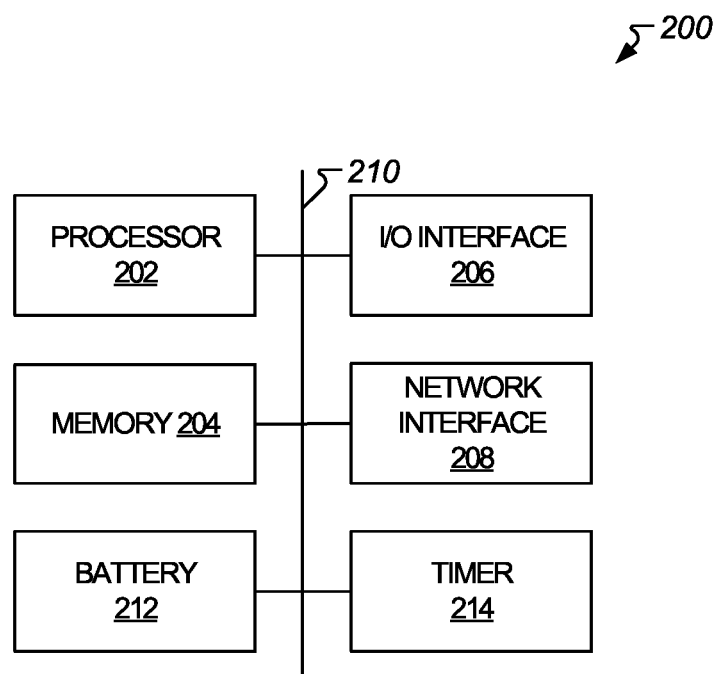
FIG. 2 is a block diagram of an example computing system to implement the various user interfaces, methods, functions, etc., for maintaining and detecting failures of sump pumps, in accordance with disclosed embodiments.

FIG. 2 is a block diagram of an example computing system 200 configured in accordance with described embodiments. The example computing system 200 may be used to, for example, implement all or part of the sump pump controller 138 and/or, more generally, the sump pump system 100. The computing system 200 may be, for example, a computer, an embedded controller, an Internet appliance, and/or any other type of computing device. Any one or more of the server 164, the hub 152, the device 158, or the controller 138 may be similar to the system 200, and may have components identical to or similar to those of the system 200.

The computing system 200 includes, among other things, a processor 202, memory 204, input/output (I/O) interface(s) 206 and network interface(s) 208, all of which are interconnected via an address/data bus 210. The program memory 204 may store software and/or machine-readable instructions that may be executed by the processor 202. It should be appreciated that although FIG. 2 depicts only one processor 202, the computing system 200 may include multiple processors 202. The processor 202 of the illustrated example is hardware, and may be a semiconductor based (e.g., silicon based) device. Example processors 202 include a programmable processor, a programmable controller, a graphics processing unit (GPU), a digital signal processor (DSP), an application specific integrated circuit (ASIC), a programmable logic device (PLD), a field programmable gate array (FPGA), a field programmable logic device (FPLD), etc. In this example, the processor implements sump pump controller 138.

The memory 204 may include volatile and/or non-volatile memory(-ies) or disk(s) storing software and/or machine-readable instructions. For example, the program memory 204 may store software and/or machine-readable instructions that may be executed by the processor 202 to implement the sump pump controller 138 and/or, more generally, the sump pump system 100. In some examples, the memory 204 is used to store the datastore 140.

Example memories 204 include any number or type(s) of volatile or non-volatile tangible, non-transitory, machine-readable storage medium or disks, such as semiconductor memory, magnetically readable memory, optically readable memory, a hard disk drive (HDD), an optical storage drive, a solid-state storage device, a solid-state drive (SSD), a read-only memory (ROM), a random-access memory (RAM), a compact disc (CD), a CD-ROM, a DVD, a Blu-ray disk, a redundant array of independent disks (RAID) system, a cache, a flash memory, or any other storage medium or storage disk in which information may be stored for any duration (e.g., permanently, for an extended time period, for a brief instance, for temporarily buffering, for caching of the information, etc.).

As used herein, the term non-transitory, machine-readable medium is expressly defined to include any type of machine-readable storage device and/or storage disk, to exclude propagating signals, and to exclude transmission media.

The processing platform 200 of FIG. 2 includes one or more communication interfaces such as, for example, one or more of the input/output (I/O) interface(s) 206 and/or the network interface(s) 208. The communication interface(s) enable the processing platform 200 of FIG. 2 to communicate with, for example, another device, system, host system, or any other machine such as the smart home hub 152 and/or the remote processing server 164.

The I/O interface(s) 206 of FIG. 2 enable receipt of user input and communication of output data to, for example, the user 156. The I/O interfaces 206 may include any number and/or type(s) of different types of I/O circuits or components that enable the processor 202 to communicate with peripheral I/O devices (e.g., the example sensors 124, 126, 128, 130, 132 and 134 of FIG. 1) or another system. Example I/O interfaces 206 include a universal serial bus (USB) interface, a Bluetooth® interface, a near field communication (NFC) interface, a serial interface, and/or an infrared transceiver. The peripheral I/O devices may be any desired type of I/O device such as a keyboard, a display (a liquid crystal display (LCD), a cathode ray tube (CRT) display, a light emitting diode (LED) display, an organic light emitting diode (OLED) display, an in-place switching (IPS) display, a touch screen, etc.), a navigation device (e.g., a mouse, a trackball, a capacitive touch pad, a joystick, etc.), a speaker, a microphone, a printer, a button, etc. Although FIG. 2 depicts the I/O interface(s) 206 as a single block, the I/O interface(s) 206 may include any number and/or type(s) of I/O circuits or components that enable the processor 202 to communicate with peripheral I/O devices and/or other systems.

The network interface(s) 208 enable communication with other systems (e.g., the smart home hub 152 of FIG. 1) via, for example, one or more networks (e.g., the networks 154 and 162). The example network interface(s) 208 include any suitable type of wired and/or wireless network interface(s) configured to operate in accordance with any suitable protocol(s) like, for example, a TCP/IP interface, a Wi-Fi™ transceiver (according to the IEEE 802.11 family of standards), an Ethernet transceiver, a cellular network radio, a satellite network radio, a coaxial cable modem, a digital subscriber line (DSL) modem, a dialup modem, or any other suitable communication protocols or standards. Although FIG. 2 depicts the network interface(s) 208 as a single block, the network interface(s) 208 may include any number and/or type(s) of network interfaces that enable the processor 202 to communicate with other systems and/or networks.

To provide, for example, backup power for the example sump pump controller 138 and/or, more generally, the example sump pump system 100, the example computing system 200 may include any number and/or type(s) of battery(-ies) 212.

To determine the time between events, the example computing system 200 includes any number and/or type(s) of timer(s) 214. For example, a timer 214 may be used to periodically trigger (e.g., every 14 days) the activation of the motor 103 for maintenance purposes. A timer 214 may, additionally and/or alternatively, be used to determine the rate at which water is rising in the sump basin (e.g., number of activations of the motor 103 required) during a period of time.

Figure 3:
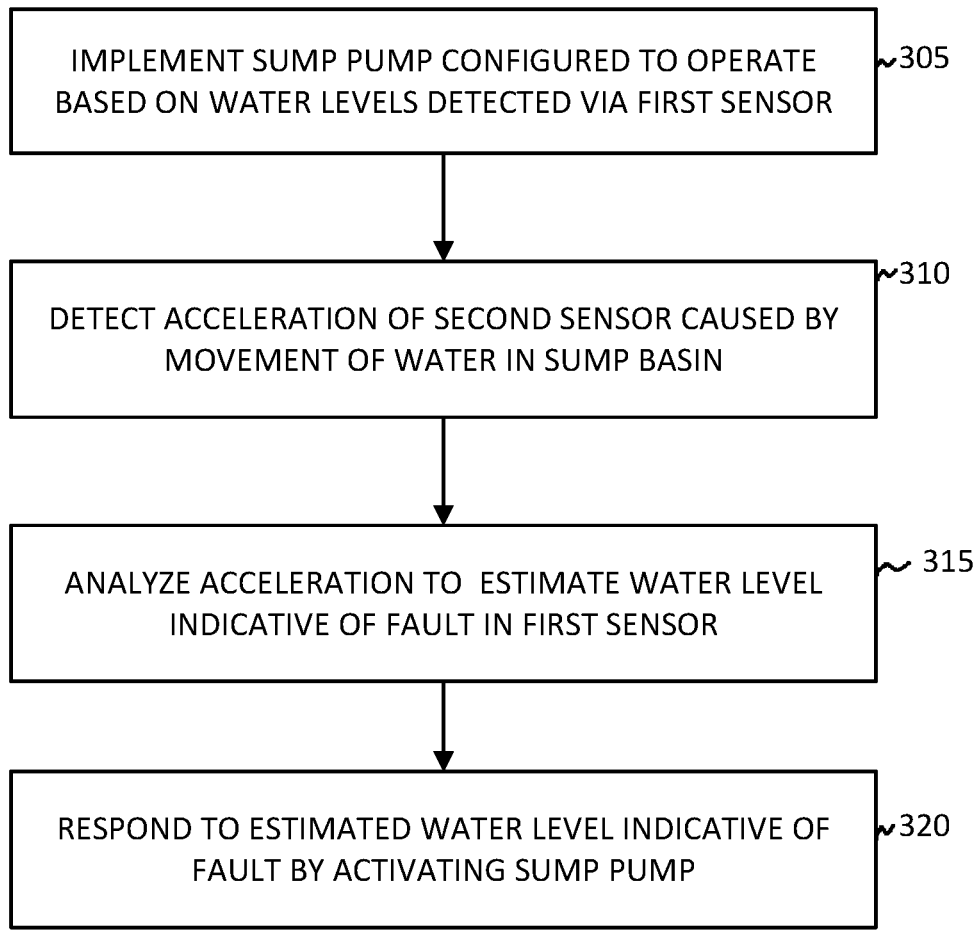
FIG. 3 depicts an example method 300 for detecting and utilizing motion of water in sump basins when implementing control of sump pumps, according to an embodiment.

FIG. 3 depicts an example method 300 for detecting and utilizing motion of water in sump basins when implementing control of sump pumps. A sump pump system may implement the method 300 to detect a malfunctioning level sensor that is used by the pump to detect high-water and low-water marks at which the sump pump activates and deactivates, respectively. By contrast, most sump pump systems on the market do not utilize sensors capable of detecting a malfunction of a typical float sensor in a sump pump, much less capable of detecting such a malfunction in the manner described with respect to the method 300. As a result, float sensors represent a single point of failure in many sump pump systems. If the float sensor gets "stuck" while disengage or deactivated, for example, the sump pump may fail to detect a high-water mark in the sump basin, resulting in the sump pump failing to activate or engage when one would typically expect, resulting in the sump basin overflowing (and potentially resulting in a basement in which the sump pump is installed flooding, potentially leading to costly water damage to walls, floors, furniture, electronics, etc.). Alternatively, if the float sensor becomes "stuck" after activating or engaging, the sump pump may continuously run. While this may prevent an overflow of the sump basin in the short-term, the sump pump motor may quickly burn out if this condition is corrected. And at that point, the sump basin is obviously at risk of overflowing.

At a high level, a system implementing the method 300 relies on sensor(s) configured to detect motion (e.g., acceleration), which can be analyzed to calculate water rise rates. These sensors may be accelerometers, gyroscopes, inertial measurement units (IMUs), or force acceleration sensors. Generally speaking, the sensor(s) may be disposed on or within the water, and may be responsive to the water such that, when the water level rises or drops, the sensor(s) responsively and proportionally drop. Accordingly, one may use a technique akin to dead-reckoning, in which relative changes in the water level are detected for the purpose of approximating the water level in the sump basin.

Alternatively or additionally, the data from these sensors that detect motion or acceleration may be analyzed, for example, to identify acceleration or vibration patterns that correspond to certain water levels. For example, inlet pipes into the sump basin are generally set at a fixed position above the bottom of the sump basin. As a result, when the water level is low, the water will fall further from the pipe before hitting the water in the basin than it will when the basin is nearly full. As a result, the water will be disturbed in different manners when the sump basin is 0% full, 25% full, 50% full, 75% full, 100% full, etc. The acceleration data from the sensors can be analyzed to detect these different disturbance patterns in the water (sometimes call acceleration patterns or vibration patterns), and can thus be used as proxies for water level.

Note, the patterns and corresponding levels may be updated over time, rather than static. For example, the rate of in-flow into the basin may also impact the disturbance pattern of water in the basin. As a result, the sump pump control system may continuously adapt and update known relationships between water vibration patterns and estimated water levels. For example, in a given cycle, the system may identify a water disturbance pattern when the pump engages (because this is a known level, such as 10% full) and another water disturbance pattern when the pump disengages (again, because this is a known level, such as 90% full). If desired, the system may interpolate between these points and analyze the difference between disturbance patterns to "guess" disturbance patterns at other points based on time between activation and deactivation. For example, if two minutes pass between engagement and disengagement, the system may "guess" that a water disturbance pattern at a water level of 50% is an average of the 90% and 10% marks. This may be performed for any desired number of water levels. Likewise, this observation and calculation may be performed at any desired rate (e.g., every cycle, every other cycle, every fifth cycle, etc.). Further, the system may use a rolling average if desired (e.g., wherein patterns from a number of past cycles are considered). If desired, a machine-learning algorithm may be utilized to learn correlations between patterns and water levels, and may be implemented to estimate level based on observed vibration or acceleration patterns. In some instances, the vibration or acceleration sensors may be installed in one or more inlet pipes and may be used to monitor in-flow (which can be used to help determine level). For example, the inlet pipes may themselves move slightly when water is flowing through them. In some instances, sensors may be tether to the inner wall of a pipe, resulting in the sensor moving when water flows through the inlet pipes.

In any event, returning to FIG. 3, the method 300 may be implemented, in whole or in part, by any suitable controller or system such as the sump pump controller 138 shown in FIG. 1 or the sump pump processor 202 shown in FIG. 2. In an embodiment, the method 300 may be embodied by a set of instructions or routines that are stored to memory and executable by a processor (e.g., of the controller 138) to implement the functionality of the method 300. If desired, the smart home hub 152 or the remote processing server 164 shown in FIG. 1, for example, may implement the method 300, depending on the embodiment. Understand that while the description below references structural or software components of a sump pump system shown in FIG. 1, the method 300 may be implemented with respect to any suitable sump pump and sump pump system to perform the described functions below.

At a step 305, a sump pump (e.g., the sump pump 102) is implemented. The sump pump may be configured to operate based on water levels detected via a first sensor, such as the float switch 122 shown in FIG. 1. If desired, the first sensor may be a float level sensor, which is a sensor designed for point level detection (i.e., detecting a binary condition; water is either detected at a particular point or it is not detected) rather than a "continuous" level of detection. So for example, a float switch that detects only two "points" such as a high-water mark and a low-water mark, is a point level sensor.

For the most part, a float level sensor works as a switch to engage a function when the tank level either rises or falls to a certain level. This could be to sound an alarm or to engage a piece of equipment. Essentially, the sensor detects when the liquid has reached the desired point and it acts as a switch to activate the necessary response.

At a step 310, a sump pump controller (e.g., 134) for the sump pump detects acceleration of a second sensor (e.g., the sensor 126) that is caused by movement of water in the sump basin (e.g., the basin 104).

At a step 315, the sump pump controller analyzes acceleration data, representing the detected acceleration, to estimate a water level that is indicative of a fault in the first sensor. For example, the controller may detect and quantify a change in position of the second sensor based on the analysis, and may track this change in position relative to a previously known position in order to estimate a current water level.

As another example, the controller may identify an acceleration pattern (sometimes called water vibration pattern or ripple pattern) indicative of a current water level. The controller may do this by comparing a detected ripple pattern to known ripple patterns that are stored to memory as being associated with various levels. In an embodiment, the controller detects a transition in ripple patterns that indicates a water inlet pipe has become at least partially submerged by water. Due to at least some of the in-flow being under water, this may result in a detectable change in water movement in the sump basin. Further, because the height of the inlet pipe(s) within the sump basin are constant, the controller may be programmed to estimate the water level is at this known level when the transition is detected. In some embodiments, the controller may implement machine learning techniques to detect these transitions and estimate a water level (e.g., based on training procedures involving analyzing various water signature patterns and known sump basin levels).

In any event, the controller may determine that the estimated water level is at a level indicative of a potential fault in the first sensor. For example, the controller may determine that either a high-water mark or a low-water mark has been crossed but not detected by the first sensor. In embodiments in which the first sensor is configured to detect other water levels (e.g., 50% full), the controller may likewise determine that the 50% mark has been crossed but not detected by the first sensor.

As another example, the controller may determine that one or more water vibration patterns detected via the second sensor indicate a particular in-flow or range of in-flow. The controller may calculate an expected duration to the high-water mark based on this estimated in-flow, and may trigger activation of a timer. When the timer indicates the duration of time has been exceeded (e.g., potentially including a buffer of time), the controller may conclude that the high-water mark has potentially or likely been exceeded.

In some instances, the controller may determine that the estimated water level confirms that the first sensor is functional and accurate. For example, the controller may determine that the first sensor detected a high-water mark and that the second sensor detected a vibration pattern of water consistent with known water vibration patterns typically present at a high-water mark.

In some embodiments, the controller 138 may assess the sump pump system condition by analyzing motor control characteristics such as current draw and pump motor 103 rotation speed. Based on the analysis, the controller 138 may determine whether the pump 102 is pumping water or air. The controller 138 can utilize the dry/submerged status of the pump 102 to calculate a fill rate and/or a level of water (e.g., without directly sensing a water level via a level sensor).

For example, the controller 138 may calculate (or be configured to store) a high-water volume (i.e., the volume of water in the basin when the water reaches the high-water mark). Similarly, the controller 138 may calculate (or be configured to store) a dry-pump volume (i.e., the volume of water in the basin when the water drops low enough to result in the pump 102 pumping air rather than water). The difference between the high-water volume and the dry-pump volume may be referred to as the delta volume (the controller 138 may be configured to store the delta volume, or it may be configured to calculate the delta volume). For example, the delta volume may be 2.5 gallons. The controller 138 may detect when the high-water volume exists (because the time at which the pump 102 is activated is likely the same time at which the high-water volume is achieved). Further, using the described techniques, the controller 138 may detect a moment at which an active pump or impeller starts pumping air instead of water. The controller 138 may calculate the time (e.g., 30 seconds or ½ minute) between these two moments and may divide the known delta volume (e.g., 2.5 gallons) by the calculated time (½ minute) to arrive at a fill rate (e.g., 5 gallons per minute).

Further, the controller 138 may utilize the calculated fill rate to estimate the level in the basin. For example, the controller 138 may start a timer when the water level reaches a known sensed level. For example, the low-water mark may be a known height. After a level sensor detects the low-water mark (e.g., the mark at which the pump 102 typically stops pumping), it may start the timer to track a time and may multiply the time by the fill rate to estimate the level at the time. This may be done multiple times if desired (e.g., continuously). Likewise, the controller 138 may be configured to store a known height just below the pump or impeller (i.e., the "dry-pump mark"). The controller 138 may utilize the disclosed techniques to detect (e.g. via motor control characteristics or power/current draw) a moment at which the pump starts to dry pump. The controller 138 may then assume the water level is at the dry-pump mark, and may utilize a timer and the fill rate to calculate or track an estimated water level (e.g., continuously if desired). The estimated water level may be used as a secondary or back-up level tracking (e.g., in case the primary level sensor faults). In other words, if an estimated water level indicates the water is above the high-water mark and a primary level sensor has not detected water at the high-water mark, the controller 138 may nevertheless activate the pump 102 to prevent flooding. If desired, the controller 138 may generate an alarm to notify someone (e.g., a user 156 or a home insuring party) that the level sensor may be faulty. Using motor characteristics change over time to determine water rise rate in the sump basin 104 can be used in addition to or instead of detecting a correlation between the identified one or more acceleration patterns detected from a sensor mounted on a sump pump or a sump pipe (e.g., the sensor 128) and one or more sump pump conditions corresponding to the identified patterns.

In any event, at a step 320, the controller responds to estimating that the water level is indicative of the first sensor experiencing a fault by activating or engaging the sump pump. That is, to address a likelihood that a high-water mark has been crossed (or is at risk of being crossed), the controller may activate the sump pump. In some instances, the response may include activating a back-up level sensor to the first sensor and/or a back-up sump pump.

In some instances, the controller may continue estimating water levels in the sump basin in accordance with the techniques described above. In some instances, the controller may institute a time-based schedule for cycling activation and deactivation of the sump pump based, for example, on an estimated in-flow rate that is estimated based on water signatures and/or based on rates calculated between deactivation and activation times when the first sensor was known (because the high-water and low-water marks are constant and known, the controller can calculate a time between 10% full and 90% full, for example). In some instances, the controller may switch to a mode in which it cycles (i.e., activates and deactivates) based on water patterns corresponding estimated to correspond to low-water and high-water marks. In an embodiment, the controller's response to detecting the fault may include generating an alarm. In some embodiments, the alarm may be a trigger to order replacement sump pump system components and their necessary fixtures. The trigger may be, for example, a push notification to the user device linked to the user's (e.g., the user 156) account with an online retailer of the user's choice. The notification may be an alert requiring the user's approval to complete the order.

In some embodiments, the controller 138, based on the rise rate measurement, may respond by adjusting the pumping rate of the sump pump 102, where the sump pump motor 103 may be a variable speed motor. A known parameter of the dimensions of the sump basin 104 (e.g., diameter or width and length) and the detected water level rise rate would yield a volume of water rise level per unit of time (e.g., gallons per second, or gallons per minute). The controller 138 may adjust the pumping rate of the sump pump 102 to the match or overcome the water rise rate for a specific size of the sump basin 104. The controller 138 may implement this control in addition to or instead of generating an alert to, for example, the user 156.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Referencing the method 300 specifically, the described functions may be implemented, in whole or in part, by the devices, circuits, or routines of the system 100 shown in FIG. 1. The method 300 may be embodied by a set of circuits that are permanently or semi-permanently configured (e.g., an ASIC or FPGA) to perform logical functions of the respective method or that are at least temporarily configured (e.g., one or more processors and a set instructions or routines, representing the logical functions, saved to a memory) to perform the logical functions of the respective method.

Throughout this specification, plural instances may implement components, operations, or structures described as a single instance. Although individual operations of one or more methods are illustrated and described as separate operations, one or more of the individual operations may be performed concurrently in certain embodiments.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Further, the phrase "wherein the system includes at least one of X, Y, or Z" means the system includes an X, a Y, a Z, or some combination thereof. Similarly, the phrase "wherein the component is configured for X, Y, or Z" means that the component is configured for X, configured for Y, configured for Z, or configured for some combination of X, Y, and Z.

In addition, use of the "a" or "an" are employed to describe elements and components of the embodiments herein. This description, and the claims that follow, should be read to include one or at least one. The singular also includes the plural unless it is obvious that it is meant otherwise.

Further, the patent claims at the end of this document are not intended to be construed under 35 U.S.C. § 112(f) unless traditional means-plus-function language is expressly recited, such as "means for" or "step for" language being explicitly recited in the claim(s). At least some aspects of the systems and methods described herein are directed to an improvement to computer functionality, and improve the functioning of conventional computers.

What is claimed is:

1. A system for detecting and utilizing motion of water in sump basins when implementing control of sump pumps, the system comprising:
   a sump pump disposed in a sump basin and configured to pump water out of the sump basin via an outlet pipe, the sump pump including a first sensor that is configured to detect water levels in a sump basin, wherein the sump pump is configured to activate and deactivate based on an output from the first sensor representing the detected water levels;
   a second sensor that is configured to be disposed on or within water in the sump basin and that is configured to detect acceleration;
   a sump pump control system communicatively coupled to the sump pump and the second sensor, wherein the sump pump control system is configured to:
      detect, via the second sensor, acceleration data representing detected acceleration of the second sensor;
      analyze the acceleration data to estimate a water level that is indicative of a potential fault in the first sensor, wherein estimating the water level includes
         detecting within the acceleration data, a ripple pattern and comparing the detected ripple pattern to at least one known ripple pattern associated with a sump pump condition, and
         determining within the acceleration data, based on the comparing, a transition from a first ripple pattern indicative of an inlet pipe being above the water level to a second ripple pattern indicative of the inlet pipe being at least partially submerged below the water level; and
      in response to the determining, activate the sump pump.

2. The system of claim 1, wherein the sump pump control system is further configured to analyze the acceleration data to estimate a water level that is indicative of a potential fault in the first sensor in a manner that comprises:
   analyzing the acceleration data to determine water has been moving in the sump basin in a manner consistent with water flowing into the sump basin for a period of time exceeding a threshold length of time.

3. The system of claim 1, wherein the known ripple patterns are stored to system memory.

4. The system of claim 1, wherein the first sensor is a point level sensor including a switch connected to a float, wherein the switch energizes when the float reaches a high-water mark and deenergizes when the float reaches a low-water mark.

5. The system of claim 1, wherein the first sensor is a capacitance sensor.

6. The system of claim 1, wherein the first sensor is an ultrasonic sensor or a radar sensor.

7. The system of claim 1, wherein the sump pump control system is further configured to:
   detect second acceleration data after the sump pump has been activated;
   estimate that the water level has dropped below a threshold level based on an analysis of the second acceleration data; and
   in response to estimating that the water level has dropped below a threshold level, deactivating the sump pump.

8. The system of claim 1, wherein the sump pump control system is further configured to generate an alarm, configured to be audible at the sump basin, to indicate to a user that water is backflowing into the sump basin.

9. The system of claim 1, wherein the sump pump control system is further configured to transmit a message to a smart home system to cause the smart home system to activate an alarm at an electronic user interface device associated with a user.

10. The system of claim 1, wherein the sump pump control system is further configured to analyze the acceleration data to estimate a water level that is indicative of a potential fault in the first sensor in a manner that comprises implementing machine learning techniques.

11. A method for detecting and utilizing motion of water in sump basins when implementing control of sump pumps, the method comprising:
   implementing a sump pump including a first sensor that is configured to detect water levels in a sump basin, wherein the sump pump is configured to activate and deactivate based on an output from the first sensor representing the water levels;
   detecting, via a second sensor that is configured to be disposed on or within water in the sump basin, acceleration of the second sensor and generating acceleration data representing the detected acceleration;
   analyzing the acceleration data to estimate a water level that is indicative of a potential fault in the first sensor, wherein estimating the water level includes
      detecting within the acceleration data, a ripple pattern and comparing the detected ripple pattern to at least one known ripple pattern associated with a sump pump condition, and
      determining within the acceleration data, based on the comparing, a transition from a first ripple pattern indicative of an inlet pipe being above the water level to a second ripple pattern indicative of the inlet pipe being at least partially submerged below the water level; and in response to the determining, activating the sump pump.

12. The method of claim 11, wherein analyzing the acceleration data to estimate a water level that is indicative of a potential fault in the first sensor further comprises: analyzing the acceleration data to determine water has been moving in the sump basin in a manner consistent with water flowing into the sump basin for a period of time exceeding a threshold length of time.

13. The method of claim 11, wherein
the known ripple patterns are stored to memory.

14. The method of claim 11, wherein the first sensor is a point level sensor including a switch connected to a float, wherein the switch energizes when the float reaches a high-water mark and deenergizes when the float reaches a low-water mark.

15. The method of claim 11, wherein the first sensor is a capacitance sensor.

16. The method of claim 11, wherein the first sensor is an ultrasonic sensor or a radar sensor.

17. The method of claim 11, further comprising:
analyzing the output from the second sensor, after activating the pump, to identify second acceleration data;
estimating that the water level has dropped below a threshold level based on an analysis of the second acceleration data; and
in response to estimating the water level has dropped below a threshold level, deactivating the sump pump.

18. The method of claim 11, further comprising generating an alarm, configured to be audible at the sump basin, to indicate to a user that water is backflowing into the sump basin.

19. The method of claim 11, further comprising transmitting a message to a smart home system to cause the smart home system to activate an alarm at an electronic user interface device associated with a user.

20. The method of claim 11, wherein analyzing the acceleration data to estimate a water level that is indicative of a potential fault in the first sensor comprises implementing machine learning techniques.

* * * * *